United States Patent
Mishra

(10) Patent No.: US 8,024,380 B2
(45) Date of Patent: Sep. 20, 2011

(54) IMPROVING DATA ACCESS SPEED WHILE PROCESSING TRANSACTION REQUESTS FROM WEB BASED APPLICATIONS

(75) Inventor: Amulya Mishra, Hyderabad (IN)

(73) Assignee: Oracle International Corporation, Redwood Shores, CA (US)

(*) Notice: Subject to any disclaimer, the term of this patent is extended or adjusted under 35 U.S.C. 154(b) by 359 days.

(21) Appl. No.: 11/308,126

(22) Filed: Mar. 8, 2006

(65) Prior Publication Data

US 2007/0162498 A1    Jul. 12, 2007

(30) Foreign Application Priority Data

Jan. 12, 2006 (IN) .............................. 0049/CHE/2006

(51) Int. Cl.
*G06F 7/00*    (2006.01)

(52) U.S. Cl. ......... 707/821; 707/667; 707/804; 707/828

(58) Field of Classification Search .............. 707/667, 707/804, 821, 828; 463/40, 41, 42
See application file for complete search history.

(56) References Cited

U.S. PATENT DOCUMENTS

| | | | | |
|---|---|---|---|---|
| 5,991,809 A | * | 11/1999 | Kriegsman | 709/226 |
| 7,188,170 B1 | * | 3/2007 | Burnley et al. | 709/224 |
| 7,272,666 B2 | * | 9/2007 | Rowan et al. | 710/5 |

* cited by examiner

*Primary Examiner* — James McClellan
(74) *Attorney, Agent, or Firm* — Narendra Reddy Thappeta

(57) ABSTRACT

Storing static data in a secondary storage and varying data in a database server. The static data can be stored in the database server also. In an embodiment, all the read/write requests related to the static data are sent to the secondary storage. Any updates to the static data are then propagated from the secondary storage to the database server at periodic intervals.

15 Claims, 7 Drawing Sheets

FIG. 5

| Identifier | Account Type_Short Name |
|---|---|
| AT0001 | Savings |
| AT0002 | Current |
| AT0003 | Recurring |

FIG. 6

```
601: <TABLE name ="CUSTOMER_ACCOUNT_TYPES">
605:   <ROW>
610:     <IDENTIFIER>AT0001</IDENTIFIER>
615:     <ACCOUNT_TYPE>Savings</ACCOUNT_TYPE>
620:   </ROW>
630:   <ROW>
635:     <IDENTIFIER>AT0002</IDENTIFIER>
640:     <ACCOUNT_TYPE>Current</ACCOUNT_TYPE>
645:   </ROW>
650:   <ROW>
655:     <IDENTIFIER>AT0003</IDENTIFIER>
660:     <ACCOUNT_TYPE>Recurring</ACCOUNT_TYPE>
665:   </ROW>
680: </TABLE>
```

| ROW_IDENTIFIER | CUSTOMER_IDENTIFIER | NAME | CUSTOMER_ACCOUNT_TYPE |
|---|---|---|---|
| 0000001000 | C0000001 | Customer 1 | AT0001 |
| 0000001001 | C0000002 | Customer 2 | AT0001 |
| 0000001002 | C0000003 | Customer 3 | AT0003 |
| 0000001003 | C0000004 | Customer 4 | AT0002 |
| 0000001004 | C0000005 | Customer 5 | AT0003 |
| 0000001005 | C0000006 | Customer 6 | AT0002 |

FIG. 7

IMPROVING DATA ACCESS SPEED WHILE PROCESSING TRANSACTION REQUESTS FROM WEB BASED APPLICATIONS

RELATED APPLICATIONS

The present application is related to and claims priority from the co-pending India Patent Application entitled, "Improving Data Access Speed While Processing Transaction Requests From Web Based Applications", Serial Number: 49/CHE/2006, Filed: 12 Jan. 2006, naming the same inventors as in the subject patent application.

BACKGROUND OF THE INVENTION

1. Field of the Invention

The present invention relates to web technologies and more specifically to a method and apparatus for improving data access speed while processing transaction requests from web based applications.

2. Related Art

Web based applications (or Web applications) generally refer to applications accessed by user systems over a network such as Internet, intranet etc. Such applications are commonly provided by executing the corresponding instructions on systems such as server systems.

Transaction requests are often received on networks from user systems and applications executing on server systems process the received requests. A transaction request generally refers to a set of instructions, the execution of all of which needs to be either completed or otherwise reverted to a state prior to the start of execution of the instructions (commonly referred to as 'atomicity' property).

Transaction requests typically entail accessing (read/retrieve or write/update) data (e.g., representing the data of a bank account of a customer). The data is often stored in secondary storage using applications such as database technologies.

In general, there is a need to ensure that the data be accessed with high speed (or quickly) in such environments.

BRIEF DESCRIPTION OF THE DRAWINGS

The present invention will be described with reference to the accompanying drawings briefly described below.

FIG. 5 contains static data represented in a table in an illustrative example.

FIG. 6 contains a text file defined using a markup language illustrating the manner in which static data is stored in a secondary storage in an illustrative example.

FIG. 7 contains a table in a database server storing varying data in an illustrative example.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

According to an aspect of the present invention, static data (which does not generally vary) is stored in a secondary storage and the varying data is stored in a database server which provides access to stored data using structured queries (e.g., SQL in case of database queries). All access requests directed to static data are processed using the data in the secondary storage. As a result, the access speed to static data may be enhanced.

The static data may be stored in database server also, and accordingly any updates to static data and then eventually propagated to database server.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well_known structures or operations are not shown in detail to avoid obscuring the invention.

2. Example Environment

Figure 1:
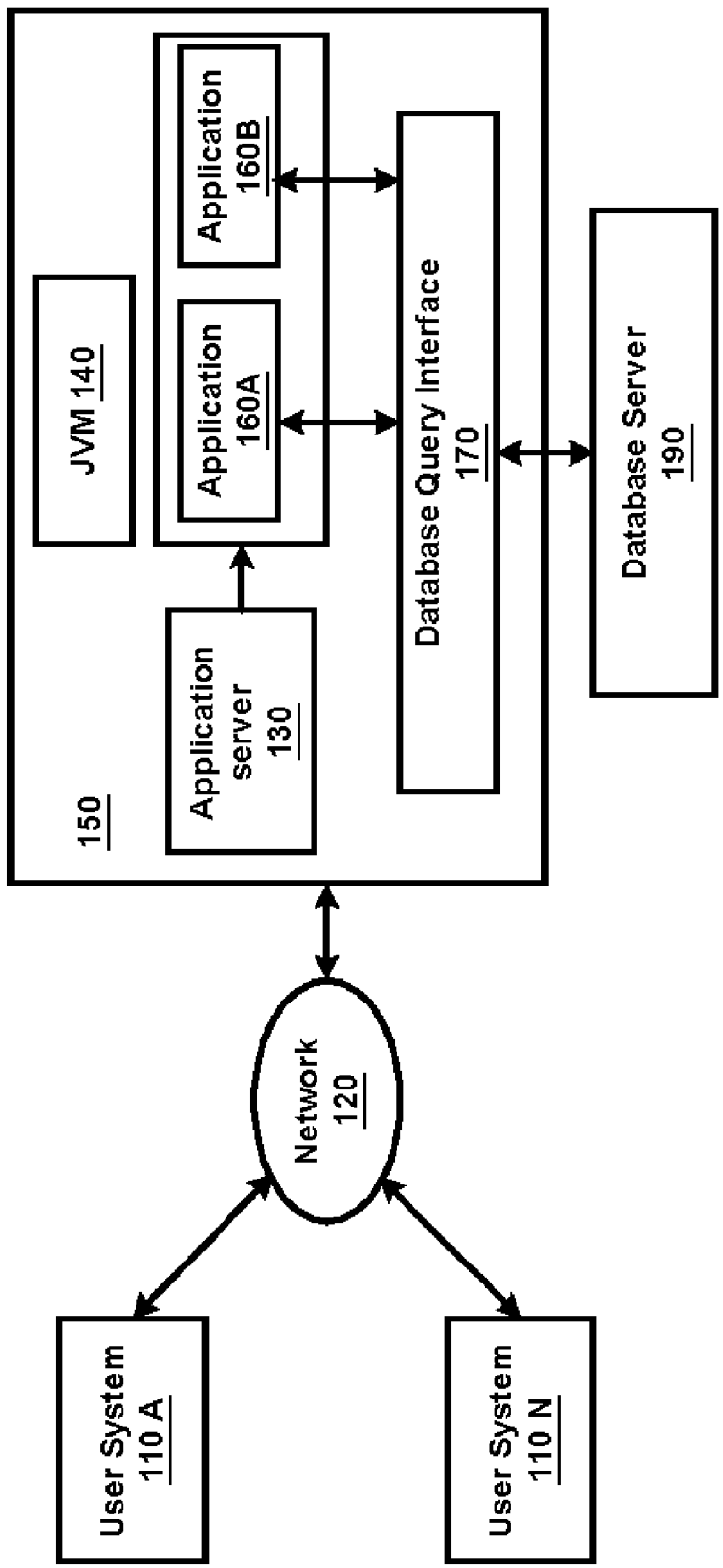
FIG. 1 is a block diagram illustrating the details of an example environment in which various aspects of the present invention can be implemented.

FIG. 1 is a block diagram illustrating an example environment in which various aspects of the present invention can be implemented. Though the various blocks correspond to an environment provided for Web applications implemented using Java™ Platform from Sun Microsystems accessing data stored in a database, various aspects of the invention can be implemented in various other environments as well. The block diagram is shown containing user systems 110A-110N, network 120, server system 150 and database server 190. Each system/device is described below in further detail.

Client systems 110A-110N represent systems which send transaction requests to server system 150, and receive the corresponding responses. The requests and responses may be integrated with various user interfaces/applications provided at client systems 110A-110N. Database server 190 implements database technologies which receive structured database queries (e.g., SQL in case of relational databases), and provides the database responses to the queries. Database server 190 may be implemented using any of various commercially available databases.

Network 120 may correspond to an internet/intranet which provides connectivity between user systems 110A-110N and server system 150. The connectivity forms the basis for sending of transaction requests from user systems 110A-110N to server system 150, and to send the responses back from server system 150 to user systems 110A-110N. Network 120 may be implemented using protocols such as Internet Protocol.

Server system 150 processes transaction requests received from client systems 110A-110N on network 120, and sends back the corresponding transaction responses again on network 120. As a part of processing the requests, database queries may be generated and sent to database server 190, and the transaction responses are generated from the received database responses. In an embodiment, server 150 contains application server 130, JVM 140, application 160, and database query interface 170, as shown. Each block is described below in further detail.

Application server 130 receives transaction requests from client system 110A-110N via network 120. Additionally, application server 130 may access data in database server 190 as required for executing instructions corresponding to the transaction request, which are contained in applications 160A-160B or may execute instructions corresponding to implementing various business logic contained in applications 160A and 160B.

Applications 160A and 160B correspond to web applications implementing various business logic. Applications 160A and 160B contain instructions (For example using Java™), implementing various business logic and/or to process various transaction requests. The instructions may be presented in the form of Byte-codes, which are interpreted and executed by JVM 140, for example, in a known way.

Instructions for processing of transaction requests generally correspond to accessing of data stored in database server 190 such as connecting to a database, issuing structured database queries indicating specific data sets to access/update. Server system 150 generally accesses/updates data in data storage 190, by executing procedures/functions specific to each database, which may be provided (or specified) by database query interface 170.

In general, the speed with which desired data can be accessed depends on factors such as implementation of data storage approaches, the specific procedures/functions provided database query interface 170, and the manner in which each of such procedures/functions are implemented. Various aspects of the present invention enable the data access speed to be enhanced. The features of the invention will be clearer in comparison to a prior approach, and accordingly the prior approach is described first.

3. Prior Approach

Figure 2:
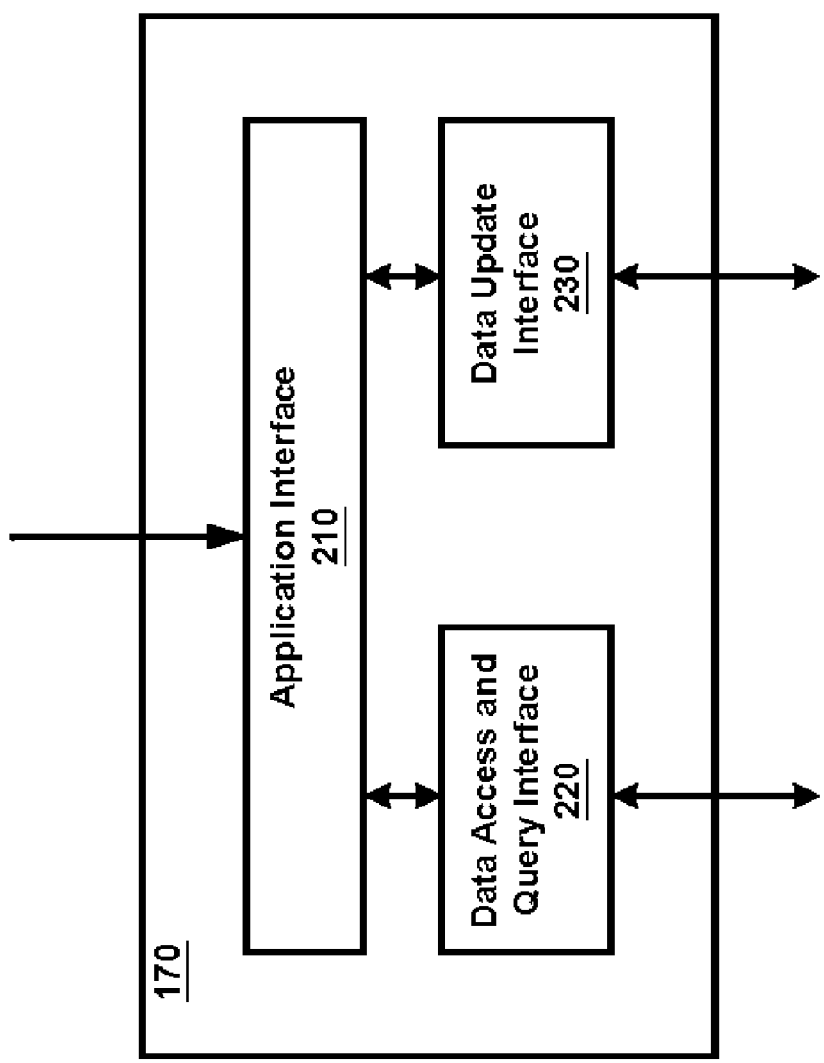
FIG. 2 is a block diagram illustrating the manner in which data is accessed while processing transaction requests in a prior approach.

FIG. 2 contains a block diagram representing database query interface 170 implemented in one prior embodiment. The block diagram contains application interface 210, data access and query interface 220 and data update interface 230. Each block is described briefly below.

Application interface 210 provides a common convention (often referred to as methods in the relevant arts) of access to various functions and procedures of database query interface 170 from various web applications installed in server system 150.

Data access and query interface 220 contains functions and procedures (for example, according to data access object (DAO) model supported by Microsoft Inc.) that are executed by server system 150 to read/retrieve data sets in the database installed in database server 190. Server system 150 may read/retrieve the desired data sets to process various transaction requests.

Data Update Interface 230 contains procedures and functions which are executed, while executing instructions in applications 160A, 160B (implemented as Enterprise Java Beans EJBs) for processing a transaction request that requires updating of data sets in the database.

One problem with such an approach is that access to database may lead to undesirably long delays (and thus low speed of access to data) due to factors such as need to establish connection to the database, additional processing time required due to need to support structure (i.e., database organization, etc.), at least in some scenarios.

The description is continued with an illustration of how data access speed can be improved while processing transaction requests from web based applications by implementing various aspects of the present invention.

The access speed is improved by recognizing there is often a portion of the data which is at least substantially static (i.e., which does not generally change), and such data can be conveniently stored in a secondary storage in simpler formats (e.g., compared to databases), thereby enhancing the speed of access to at least the data in the secondary storage.

4. Flow Chart

Figure 3:
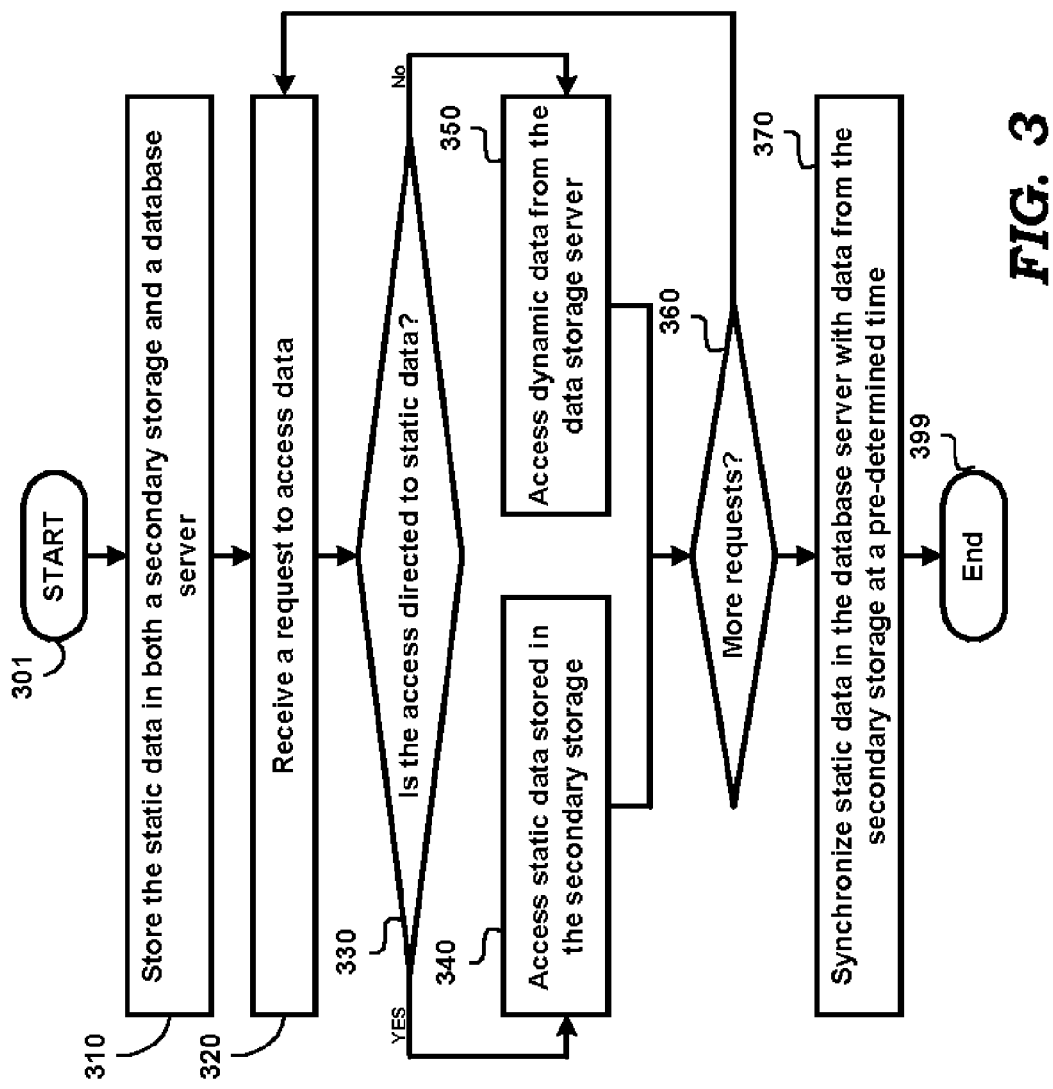
FIG. 3 is a flow chart illustrating the manner in which data access speed, while processing transaction requests from web application, can be improved according to various aspects of the present invention.

FIG. 3 is a flowchart illustrating the manner in which data access speed can be improved while processing transaction requests from web based applications according to various aspects of the present invention. The flowchart is described with respect to FIG. 1 merely for illustration. However, various features can be implemented in other environments also without departing from several aspects of the present invention, as will be apparent to one skilled in the relevant arts by reading the disclosure provided herein. The flow chart begins in step 301, in which control immediately passes to step 310.

In step 310, static data is stored in both a secondary storage in server system 150 and database server 190. As noted above, static data refers to the portion of the overall data, which is unlikely to change. In an embodiment described below, static data is stored in a file defined using a Mark-up Language in secondary storage and such storing can be performed in response to a first query directed to the static data. However, database server 190 may store the entire data (including the static data).

In step 320, server system 150 receives a request to access data. The request may indicate access to specific data sets and data elements of interest stored in database server 190. In step 330, a determination is made as to whether the access request is directed to static data. Control passes to step 340 if the access is directed to static data and to step 350 otherwise.

In step 340, server system 150 accesses static data stored in the secondary storage contained in server system 150. As the data accesses to secondary storage are faster than the data accesses to database server 190 (at least in case where the database server is in a different physical machine, as shown), the data can be accessed quickly, thereby enhancing the throughput performance (in terms of number of transactions processed for unit time) of web-based applications. Control then passes to step 360.

In step 350, server system 150 accesses varying data from the data base server consistent with the interfaces provided to access the database server. Control then passes to step 360.

In step 360, a determination is made as to whether to process more requests. Control passes to step 320 if more requests are to be processed or to step 370 otherwise.

In step 370, the static data in database server 190 is synchronized with data from the secondary storage at pre_determined time points. In general, any approaches can be used to propagate the changes in second storage to the database server. In an embodiment, the synchronization is attained by using a JDBC (Java Database Connectivity) program written in Java™ and executing in server system 150. Synchronization may be performed when there is a low load (few transactions to be processed) to be processed. The flowchart ends in step 399.

Thus, at least in the case of static data, the data access rates may be higher. Due to the reduced load on database server 190, the access rates in case of varying data may also be enhanced. The approach(es) of FIG. 3 can be implemented in various embodiments. The description is continued with respect to the details of an example embodiment.

5. System Provide Enhanced Data Access Speed

Figure 4:
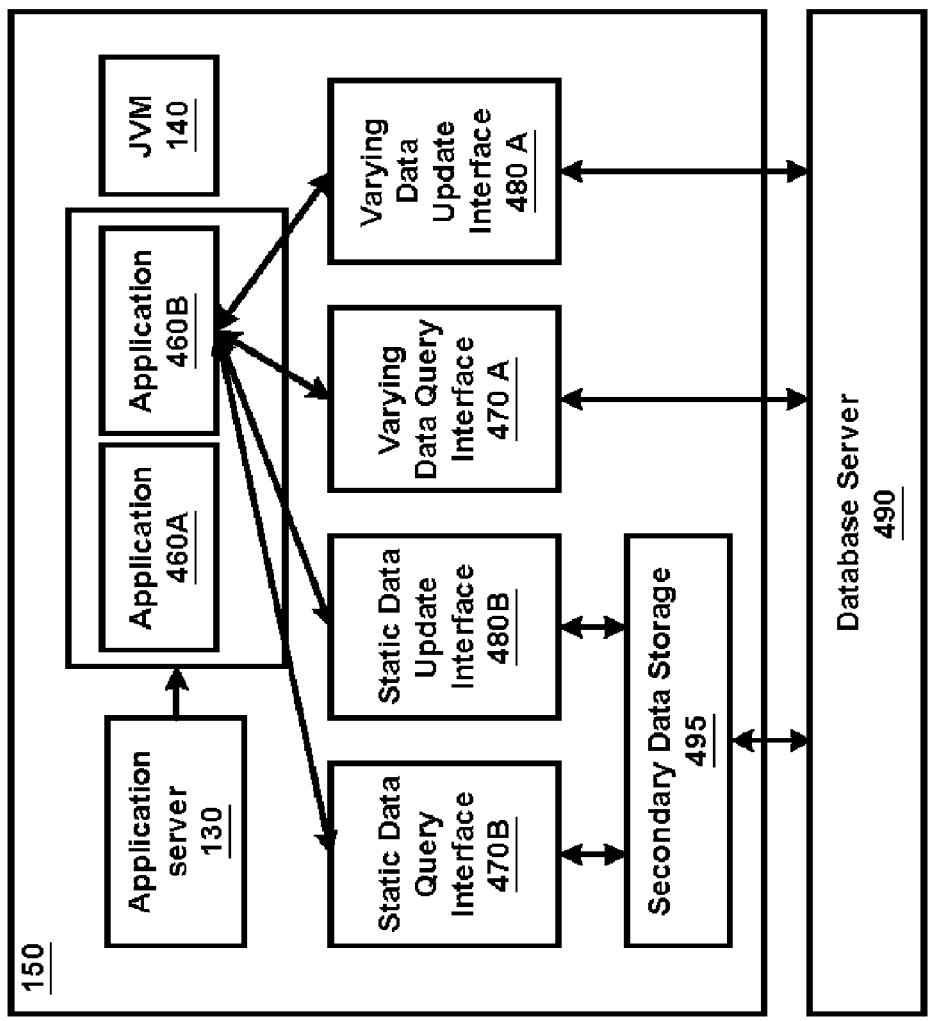
FIG. 4 is a block diagram illustrating the details of a server system in an embodiment of the present invention.

FIG. 4 is a block diagram illustrating server system 150 which is implemented according to various aspects of the present invention in order to provide enhanced data access speed. Server system 150 is shown containing applications 460A and 460B, static data query interface 470B, static data update interface 480B, varying data query interface 470A and varying data update interface 480A, application server 130, JVM 140, secondary data storage 495, database server 490. For conciseness, the blocks of FIG. 1, which operate substantially similar to corresponding blocks of FIG. 4, are repeated and the corresponding description is not repeated. The remaining blocks of FIG. 4 are described below in further detail.

Database server 490 stores all the data stored/processed by user applications. Applications written in JAVA™ implementing JDBC on server system 150 can be used to propagate to database server 490 any updates to (static) data in secondary data storage 495.

Secondary data storage 495 stores only that portion of the data which is static (i.e., varies less compared to the additional data stored in database server 490). In an embodiment described below, static data is stored using a format defined by Extended Markup Language (XML) in secondary data storage 495. Any needed updates to static data is performed first in secondary storage 495, and synchronized with database server 490 periodically (or at any desired time points).

For convenience, the data stored in secondary storage 495 is referred to as 'static data', and the remaining data (stored only in database server 490) is referred to as varying data. It may be appreciated that static data is stored in database server 490 as well.

Static data query interface 470B contains procedures and functions needed to read/retrieve the data stored in secondary storage 495. Thus, the procedures and functions are invoked by applications 460A and 460B when requiring to read/retrieve static data. As the data in the secondary storage 495 can be accessed faster than the data in database server 490, the access speed of at least the static data is enhanced, as noted above. Further, the retrieved data corresponding to specific data sets and data elements of interest are stored in an XML Data Access Object (X-DAO) (formed in a random access memory within the server system). The XDAOs can then be used for sending to specific user system requesting the data. Thus overall time required to process data requests directed towards retrieving static data may be improved.

Similarly, when a transaction request requires updating a portion of the static data contained in database server 190, procedures and functions (implemented as X-Entity Beans) contained in data update interface 480B may be executed. The implementation of the procedures and the functions in data query interface 470B and data update interface 480B needs to generally be consistent with the storage medium and format, and will be apparent to one skilled in the relevant arts depending on the details of the specific environments.

Varying data query interface 470A contains the procedures and functions needed to read/retrieve the (varying) data in database server 190. The procedures and functions may be designed to read/retrieve only the varying data. Similarly, varying data update interface 480A contains the functions and procedures needed to update the (varying) data in database server 190.

Applications 460A and 460B need to be designed consistent with the procedures and functions (X-Entity Beans) and retrieved static data definitions (X-DAO) noted above. Thus, applications 460A and 460B need to be designed to invoke the functions/procedures in interfaces 470B and 480B while reading or retrieving/updating static data, and the functions procedures in interfaces 470A and 480A while reading or retrieving/updating varying data. The implementation of applications 460A and 460B consistent with such requirements will be apparent to one skilled in the relevant arts.

Since static data is read/retrieved and/or updated in secondary data storage 495 while processing corresponding transaction requests, data access speed and the throughput performance can be enhanced.

The description is continued with an illustration of an example data set in data base server 190 which has been identified as static data and storing of such static data in secondary data storage 190 in an embodiment of the present invention.

6. Example Static Data

FIG. 5 contains a table in a database stored in database server 190 which contains a portion of the data which has been identified as static (e.g., by a designer). The table of FIG. 5 is shown containing 2 columns identifier 510 and account type_short name 520.

Rows 530, 540 and 550 contain corresponding values under the columns identifier 510 and account type_short name 520 as {"AT0001", "Savings"}, {"AT0002", "Current"} and {"AT0003", "Recurring"}.

FIG. 6 contains a text file defined according to XML format in secondary data storage 495. As may be appreciated, the text file of FIG. 6 contains corresponding data entries of rows 530, 540 and 550 as the data has been identified as static. The content of the text file is briefly described below.

Lines 605-620 contains values corresponding to row 530. As may be appreciated, value "AT001" enclosed between tags <IDENTIFIER> and </IDENTIFIER> corresponds to value under column identifier 510 of row 53. Similarly, the value "Savings" enclosed between tags <ACCOUNT TYPE> and </ACCOUNT TYPE> indicates a corresponding value under column Account type_short name 520 of row 530.

Lines 630-645 and 650-665 similarly contain values corresponding to rows 540 and 550 respectively.

The data corresponding to static data thus stored in secondary data storage 495 can be read/retrieved by executing appropriate procedures and/or functions in static data query interface 470B and can be updated by executing the corresponding procedures/functions in static data update interface 480B, thus avoiding accessing the corresponding data stored in the database of contained in database server 190.

The description is continued with an illustration of an example data stored in database server 190 which is identified as varying data.

7. Example Varying Data

FIG. 7 indicates a table defined in the database contained in database server 190. The table is shown containing columns row_identifier 710, customer_identifier 720, name 730, customer_account_type 740.

As may be appreciated, values under columns row_identifier 710, customer_identifier 720, name 730, customer_account_type 740 together indicate account type associated with each row (751-756) identified by the corresponding value in column row_identifier 710. For example, row 751 identified by a value "0000001000" (row_identifier 710), contains values "C0000001", "Customer 1" under corresponding columns customer_identifier 720 and name 730 and the account type associated is "AT0001" (under column customer_account_type 740).

Similarly, rows 752-756 contain value of account type (under column customer_account_type 740) as "AT0001", "AT0003", "AT0002", "AT0003", "AT00002" respectively, which corresponds to one of the values contained in rows 530, 540 and 550 (stored under column account type_short name 520).

When a transaction request directed to reading/retrieving such varying data, procedures and/or functions contained in varying data query interface 470A are executed by server system 150 and when a transaction request requires updating of such varying data, procedure and/or functions contained in varying data update interface 480A are executed.

The description is continued with an illustration of how transaction requests can be processed with improved data access speed.

8. Processing Transaction Requests

The description is continued with an illustration of how processing of various transaction requests involving static and varying data can be performed in an embodiment of the present invention. For example, when a transaction request received from user systems 110A-110N require executing of the statement (described using SQL for illustration) below Select identifier, accounttype_shortname from account type to read/retrieve data elements in table of FIG. 5, server system 150 may execute corresponding procedures/functions contained in static data query interface 470B to access and retrieve corresponding data contained in the file (of FIG. 6) stored in secondary data storage 495. The resulting data thus retrieved is sent to user systems 110A-110N.

Similarly, when a transaction request received from user systems 110A-110N requires executing of the statement (described using SQL) below Select customer identifier, name, customer_account_type from customer to read/retrieve customer details stored in the table of FIG. 7, server system 150 may execute procedures/functions contained in varying data query interface 470A to access and retrieve data stored in database server 190.

Similarly, when a transaction request requires executing the below instruction select customer identifier, name, customer_account_type, account type_short name from customer, account type where customer.customer_account_type=account type.identifier to read/retrieve both static and varying data contained in tables of FIG. 5 and FIG. 7 respectively, server system 150 may execute procedures/functions contained in varying data query interface 470A to access and retrieve customer data stored in database server 190 and procedures/functions contained in static data query interface 470B to access and retrieve corresponding data contained in the file (of FIG. 6) stored in secondary data storage 495.

Due to such recognition of static data and accessing of the static data from secondary data storage 495, data access speed and throughput performance while processing of transaction requests can be substantially improved.

When a transaction request requires executing of instructions corresponding to updating of data in database server 190 which has been identified as static, server system 150 may execute procedures contained in static data update interface 480B to update corresponding data contained in secondary data storage 495. Updates thus made to static data are later used to synchronize the corresponding data in database server 190 at pre-determined intervals.

It should be appreciated that each of server system 150 may be implemented in a combination of one or more of hardware, software and firmware. The description is continued with respect to an embodiment which various features are operative by execution of corresponding software instructions.

9. Digital Processing System

Figure 8:
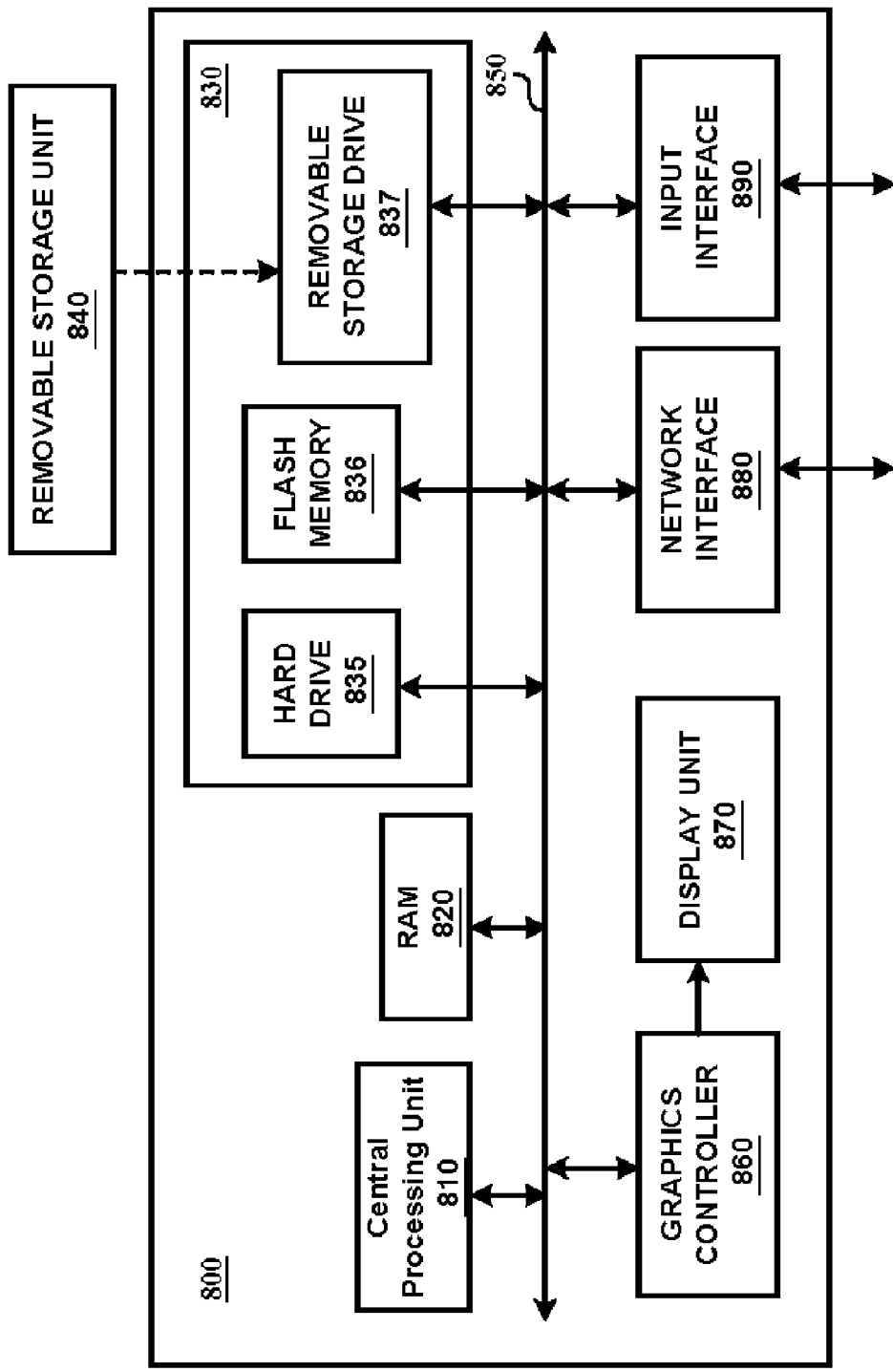
FIG. 8 is a block diagram illustrating an example embodiment in which various aspects of the present invention are operative when software instructions are executed.

FIG. 8 is a block diagram illustrating the details of digital processing system 800 in which various aspects of the present invention are operative by execution of appropriate software instructions. System 800 may correspond to server system 150. System 800 may contain one or more processors such as central processing unit (CPU) 810, random access memory (RAM) 820, secondary memory 830, graphics controller 860, display unit 870, network interface 880, and operator interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present invention. CPU 810 may contain multiple processing units, with each processing unit potentially being designed for a specific task. Alternatively, CPU 810 may contain only a single general purpose processing unit. RAM 820 may receive instructions from secondary memory 830 using communication path 850.

Graphics controller 860 generates display signals (e.g., in RGB format) to display unit 870 based on data/instructions received from CPU 810. Display unit 870 contains a display screen to display the images defined by the display signals. Operator interface 890 may correspond to a key_board and/or mouse. Network interface 880 provides connectivity to a network (e.g., using Internet Protocol), and may be used to communicate with each other system of FIG. 1.

Secondary memory 830 may contain hard drive 835, flash memory 836 and removable storage drive 837. Secondary memory 830 may store the data and software instructions (e.g., methods instantiated by each of user systems), which enable system 800 to provide several features in accordance with the present invention. Some or all of the data and instructions may be provided on removable storage unit 840, and the data and instructions may be read and provided by removable storage drive 837 to CPU 810. Floppy drive, magnetic tape drive, CD_ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable storage medium having stored therein computer software and/or data.

In this document, the term "computer program product" is used to generally refer to removable storage unit 840 or hard disk installed in hard drive 835. These computer program products are means for providing software to system 800. CPU 810 may retrieve the software instructions, and execute the instructions to provide various features of the present invention described above.

10. CONCLUSION

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of processing a plurality of transaction requests received from a web based application, wherein said plurality of transaction requests process data containing a static portion and a varying portion, wherein data in said varying portion is likely to be updated substantially more frequently than data in said static portion due to processing of said plurality of transaction requests, said method comprising:

storing said varying portion in a database server and said static portion in both said database server and a secondary storage, said varying portion containing a first plurality of data elements and said static portion containing a second plurality of data elements, wherein both of said first plurality of data elements and said second plurality of data elements are together organized in the form of a plurality of tables stored in said database server such that said database server provides access to any of said first plurality of data elements and said second plurality of elements using structured database queries, and said secondary storage does not provide access to said second plurality of data elements using structured database queries;

maintaining a data structure indicating that said second plurality of data elements are stored in said secondary data storage, wherein said data structure is in addition to storing of said second plurality of data elements in said secondary storage;

receiving from said web based application a transaction request requiring access to a data element, wherein said transaction request is contained in said plurality of transaction requests and said data element is contained in said first plurality of data elements or said second plurality of data elements;

determining whether said data element is contained in said static data, wherein said determining comprises examining said data structure to identify whether said data element is contained in said static data without having to access the corresponding data element in either the said database server or the said secondary storage;

sending a structured database query to said database server to access said data element if said data element is determined to be not contained in said static data; and accessing said data element based on said second plurality of data elements stored in said secondary storage if said data element is determined to be contained in said static data.

2. The method of claim 1, wherein said access request is a retrieve request, further comprising:

receiving a response to said structured data query if said, wherein said response contains said data element; and sending a transaction response containing said data element in response to said transaction request.

3. The method of claim 1, wherein a static element contained in said static data is stored in a file in said secondary storage and also in said database server, said method further comprising:

receiving a second transaction request requiring update of said static element;

updating said static element in said file in said secondary storage; and propagating update to said static element to said database server, wherein said updating and said propagating are performed in response to said receiving said second transaction request.

4. The method of claim 3, wherein said sending comprises invoking one of a first set of procedures/functions if said request relates to updating of said static data, invoking one a second set of procedures/functions if said request relates to updating of said varying data, invoking a third set of procedures/functions if said request relates to reading of said static data, a fourth set of procedures/functions if said request relates to reading of said varying data, wherein all of said first set of procedures/functions, said second set of procedures/functions, said third set of procedures/functions and said fourth set of procedures/functions are implemented in a single system.

5. The method of claim 1, wherein said secondary storage and said database server are provided on physically separate digital processing systems.

6. The method of claim 1, wherein said data structure is a table.

7. A computer readable medium carrying one or more sequences of instructions causing a server system to improve data access speed while processing transaction requests from web based applications, said plurality of transaction requests process data containing a static portion and a varying portion, wherein data in said varying portion is likely to be updated substantially more frequently than data in said static portion due to processing of said plurality of transaction requests, wherein execution of said one or more sequences of instructions by one or more processors contained in said database server causes said one or more processors to perform the actions of:

storing said varying portion in a database server and said static portion in both said database server and a secondary storage, said varying portion containing a first plurality of data elements and said static portion containing a second plurality of data elements, wherein both of said first plurality of data elements and said second plurality of data elements are together organized in the form a plurality of tables stored in said database server such that said database server provides access to any of said first plurality of data elements and said second plurality of elements using structured database queries, and said secondary storage does not provide access to said second plurality of data elements using structured database queries;

maintaining a data structure indicating that said second plurality of data elements are stored in said secondary data storage, wherein said data structure is in addition to storing of said second plurality of data elements in said secondary storage;

receiving from said web based application a transaction request requiring access to a data element, wherein said transaction request is contained in said plurality of transaction requests and said data element is contained in said first plurality of data elements or said second plurality of data elements;

determining whether said data element is contained in said static data, wherein said determining comprises examining said data structure to identify whether said data element is contained in said static data without having to access the corresponding data element in either the said database server or the said secondary storage;

sending a structured database query to said database server to access said data element if said data element is determined to be contained in said varying data; and accessing said data element based on said second plurality of data elements stored in said secondary storage if said data element is determined to be contained in said static data.

8. The computer readable medium of claim 7, wherein a static element contained in said static data is stored in a file in said secondary storage and also in said database server, said computer readable medium storing one or more instructions for:

receiving a second transaction request requiring update of said static element;

updating said static element in said file in said secondary storage; and propagating update to said static element to said database server, wherein said updating and said propagating are performed in response to said receiving said second transaction request.

9. The computer readable medium of claim 7, wherein said sending comprises invoking one of a first set of procedures/functions if said request relates to updating of said static data, invoking one a second set of procedures/functions if said request relates to updating of said varying data, invoking a third set of procedures/functions if said request relates to reading of said static data, a fourth set of procedures/functions if said request relates to reading of said varying data, wherein all of said first set of procedures/functions, said second set of procedures/functions, said third set of procedures/functions and said fourth set of procedures/functions are implemented in a single system.

10. The computer readable medium of claim 7, wherein said secondary storage and said database server are provided on physically separate digital processing systems.

11. The computer readable medium of claim 7, wherein said access request is a retrieve request, further comprising one or more instructions for:

receiving a response to said access request, wherein said response contains said data element; and sending a transaction response containing said data element in response to said transaction request.

12. The method of claim 7, wherein said data structure is a table.

13. A computing system to provide access to data containing a static portion and a varying portion, wherein data in said varying portion is likely to be updated substantially more frequently than data in said static portion due to processing of said plurality of transaction requests, said computing system comprising:

a database server and a secondary storage, said database server to store both of said varying portion and said static portion, said secondary storage to store only said static portion, said varying portion containing a first plurality of data elements and said static portion containing a second plurality of data elements, wherein both of said first plurality of data elements and said second plurality of data elements are together organized in the form a plurality of tables stored in said database server such that said database server provides access any of said first plurality of data elements and said second plurality of elements using structured database queries, and said secondary storage does not provide access to said second plurality of data elements using structured database queries; and a server system to receive a transaction request requiring access to a data element, said server system to determine whether said data element is contained in said static portion, said server system to send a structured database query to said database server to access said data element if said data element is determined to be not contained in said static data and to access said data element based on said second plurality of data elements stored in said secondary storage if said data element is determined to be contained in said static data, wherein said server system is further operable to maintain a data structure indicating that said second plurality of data elements are stored in said secondary data storage, wherein said data structure is in addition to storing of said second plurality of data elements in said secondary storage, wherein said server system examines said data structure to determine whether said data element is contained in said static data without having to access the corresponding data element in either the said database server or the said secondary storage.

14. The computing system of clam 13, wherein said secondary storage is provided within said server system and said static portion is stored on said secondary storage in the form of a file, said server operable to retrieve said static portion into a random access memory (RAM) in the form of an object, said server to retrieve said data element from said object if said data element is determined to be contained in said static data.

15. The computing system of claim 13, wherein said data structure is a table.

* * * * *

UNITED STATES PATENT AND TRADEMARK OFFICE
CERTIFICATE OF CORRECTION

| | | |
|---|---|---|
| PATENT NO. | : 8,024,380 B2 | Page 1 of 1 |
| APPLICATION NO. | : 11/308126 | |
| DATED | : September 20, 2011 | |
| INVENTOR(S) | : Mishra | |

It is certified that error appears in the above-identified patent and that said Letters Patent is hereby corrected as shown below:

In the drawings:
On Sheet 5 of 7, in figure 5, Box 510, line 1, delete "Identifler" and insert -- Identifier --, therefor.

In column 4, line 53-54, delete "pre_determined" and insert -- pre-determined --, therefor.

In column 6, line 53-54, delete "is shown............type 740." and insert the same on Col. 6, Line 52, after "The table" as a continuation of the same paragraph.

In column 9, line 16, in Claim 1, after "of" insert -- data --.

In column 9, line 66, in Claim 4, after "invoking" delete "one".

In column 10, line 34, in Claim 7, after "form" insert -- of --.

In column 10, line 37, in Claim 7, after "of" insert -- data --.

In column 11, line 17, in Claim 9, after "invoking" delete "one".

In column 12, line 5, in Claim 13, after "form" insert -- of --.

In column 12, line 8, in Claim 13, after "of" insert -- data --.

In column 12, line 34, in Claim 14, delete "clam" and insert -- claim --, therefor.

Signed and Sealed this
Sixth Day of December, 2011

David J. Kappos
*Director of the United States Patent and Trademark Office*